(12) United States Patent
Bin et al.

(10) Patent No.: US 12,337,701 B2
(45) Date of Patent: Jun. 24, 2025

(54) ELECTRIFIED VEHICLE AND METHOD OF CONTROLLING SAME

(71) Applicants: Hyundai Motor Company, Seoul (KR); Kia Corporation, Seoul (KR)

(72) Inventors: Seung Hyeon Bin, Hwaseong-si (KR); Byung Oh Tak, Hwaseong-si (KR); Seong Min Kim, Changwon-si (KR); Ho Rim Choi, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 306 days.

(21) Appl. No.: 18/116,463

(22) Filed: Mar. 2, 2023

(65) Prior Publication Data

US 2024/0116372 A1  Apr. 11, 2024

(30) Foreign Application Priority Data

Oct. 11, 2022  (KR) ......................... 10-2022-0129811

(51) Int. Cl.
*B60L 15/20* (2006.01)
*B60L 50/60* (2019.01)

(52) U.S. Cl.
CPC ........... *B60L 15/2045* (2013.01); *B60L 50/60* (2019.02); *B60L 2240/423* (2013.01); *B60L 2240/429* (2013.01)

(58) Field of Classification Search
CPC ................. B60L 15/20; B60L 15/2045; B60L 2240/423; B60L 2240/429; B60L 50/60
See application file for complete search history.

(56) References Cited

U.S. PATENT DOCUMENTS

| 8,482,230 | B2 * | 7/2013 | Bouchez | B60L 58/30 318/440 |
| 11,081,999 | B2 * | 8/2021 | Tobayashi | H02M 7/5395 |
| 2009/0033253 | A1 * | 2/2009 | Nagashima | B60L 15/00 320/137 |

(Continued)

FOREIGN PATENT DOCUMENTS

| CN | 105939134 B | 4/2018 |
| JP | 2008-072884 A | 3/2008 |
| KR | 10-0143222 B1 | 10/1998 |

(Continued)

*Primary Examiner* — Tyler J Lee
(74) *Attorney, Agent, or Firm* — Morgan, Lewis & Bockius LLP

(57) ABSTRACT

An electrified vehicle includes a motor including a plurality of windings, a first inverter connected to a first end of each of the plurality of windings and configured to drive the motor, a second inverter connected to a second end of each of the plurality of windings and configured to drive the motor in a second driving mode of a first driving mode and the second driving mode, a first controller configured to determine one of first and second output limit lines as an output limit line of the first driving mode, depending on whether a preset condition is satisfied, and a second controller configured to bidirectionally switch the first driving mode and the second driving mode within an operating point range according to the output limit line of the first driving mode in accordance with a value of a torque command for the motor and counter magnetic flux of the motor.

16 Claims, 8 Drawing Sheets

(56) References Cited

U.S. PATENT DOCUMENTS

2014/0085953 A1\* 3/2014 Mao ...................... H02M 7/537
                                                                      363/131
2020/0204103 A1\* 6/2020 Tobayashi ............... H02P 21/22

FOREIGN PATENT DOCUMENTS

| KR | 10-2013-0052931 A | 5/2013 |
| KR | 10-2020-0030973 A | 3/2020 |
| KR | 10-2020-0145112 A | 12/2020 |
| KR | 10-2021-0122343 A | 10/2021 |
| KR | 10-2022-0074210 A | 6/2022 |
| KR | 10-2024-0044128 A | 4/2024 |
| WO | 2006/131937 A2 | 12/2006 |

\* cited by examiner

ELECTRIFIED VEHICLE AND METHOD OF CONTROLLING SAME

CROSS REFERENCE TO RELATED APPLICATION

The present application claims priority to Korean Patent Application No. 10-2022-0129811, filed Oct. 11, 2022, the entire contents of which is incorporated herein for all purposes by this reference.

BACKGROUND OF THE PRESENT DISCLOSURE

Field of the Present Disclosure

The present disclosure relates to an electrified vehicle and a method of controlling the electrified vehicle, and more particularly, to an electrified vehicle that prevents output disconnection of a motor when motor driving modes are switched, and that improves fuel efficiency, and a method of controlling the electrified vehicle.

DESCRIPTION OF RELATED ART

Recently, a technology of driving one motor in two different modes using two inverters and a mode change switch to cover both a lower power period and a high power period and improve system efficiency is applied to a motor driving system of an electrified vehicle, etc.

One of the two different modes is a Closed End Winding (CEW) mode that drives a motor with one inverter using a Y-wiring structure and the other one is an Open End Winding (OEW) mode that drives a motor with two inverters.

A motor driving system can bidirectionally switch the CEW mode and the OEW mode by referring to a mode switch line based on a lookup table (LUT). The lookup table can be derived through a test that measures efficiency at all operating points of a motor at each voltage of the DC terminal of an inverter so that a mode with higher efficiency of two modes is performed when a motor is driven.

Accordingly, a motor driving system can increase the fuel efficiency of an electrified vehicle by switching the CEW mode and the OEW mode in accordance with a mode switch line. However, when the operating point corresponding to the mode switch line comes out of an output limit of the CEW mode, output from a motor may be disconnected when the motor driving modes are switched.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to preventing output disconnection of a motor which is generated when motor driving modes are switched by controlling the motor driving modes to be switched within an output limit of a CEW mode.

Another objective of the present disclosure is to improve the fuel efficiency of an electrified vehicle by easing an output limit of a CEW mode so that motor driving modes are switched at or close to an operating point according to a mode switch line when a predetermined condition is satisfied.

The technical subjects to implement in an exemplary embodiment of the present disclosure are not limited to the technical problems described above and other technical subjects that are not stated herein will be clearly understood by those skilled in the art from the following specifications.

To achieve the objectives of the present disclosure, an electrified vehicle according to an exemplary embodiment of the present disclosure includes: a motor including a plurality of windings; a first inverter connected to a first end of each of the windings and configured to drive the motor; a second inverter connected to a second end of each of the windings and configured to drive the motor in a second driving mode of a first driving mode and the second driving mode; a first controller configured to determine one of first and second output limit lines as an output limit line of the first driving mode, depending on whether a preset condition is satisfied; and a second controller configured to bidirectionally switch the first driving mode and the second driving mode within an operating point range according to the output limit line of the first driving mode in accordance with a value of a torque command for the motor and counter magnetic flux of the motor.

To achieve the objectives of the present disclosure, a method of controlling an electrified vehicle according to an exemplary embodiment of the present disclosure includes: determining one of first and second output limit lines as an output limit line of a first driving mode, depending on whether a preset condition is satisfied; determining whether to switch the first driving mode and a second driving mode within an operating point range according to the output limit line of the first driving mode in accordance with a value of a torque command for a motor and counter magnetic flux of the motor; driving the motor through a first inverter of the first inverter and a second inverter when the first driving mode is performed; and driving the motor through the first inverter and the second inverter when the second driving mode is performed.

According to an exemplary embodiment of the present disclosure, because the motor driving modes are controlled to be switched within the output limit of the CEW mode, it is possible to prevent output disconnection of the motor which is generated when the motor driving modes are switched.

Furthermore, according to an exemplary embodiment of the present disclosure, it is possible to improve the fuel efficiency of an electrified vehicle by easing an output limit of the CEW mode so that the motor driving modes are switched at or close to an operating point according to a mode switch line when a preset condition is satisfied.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
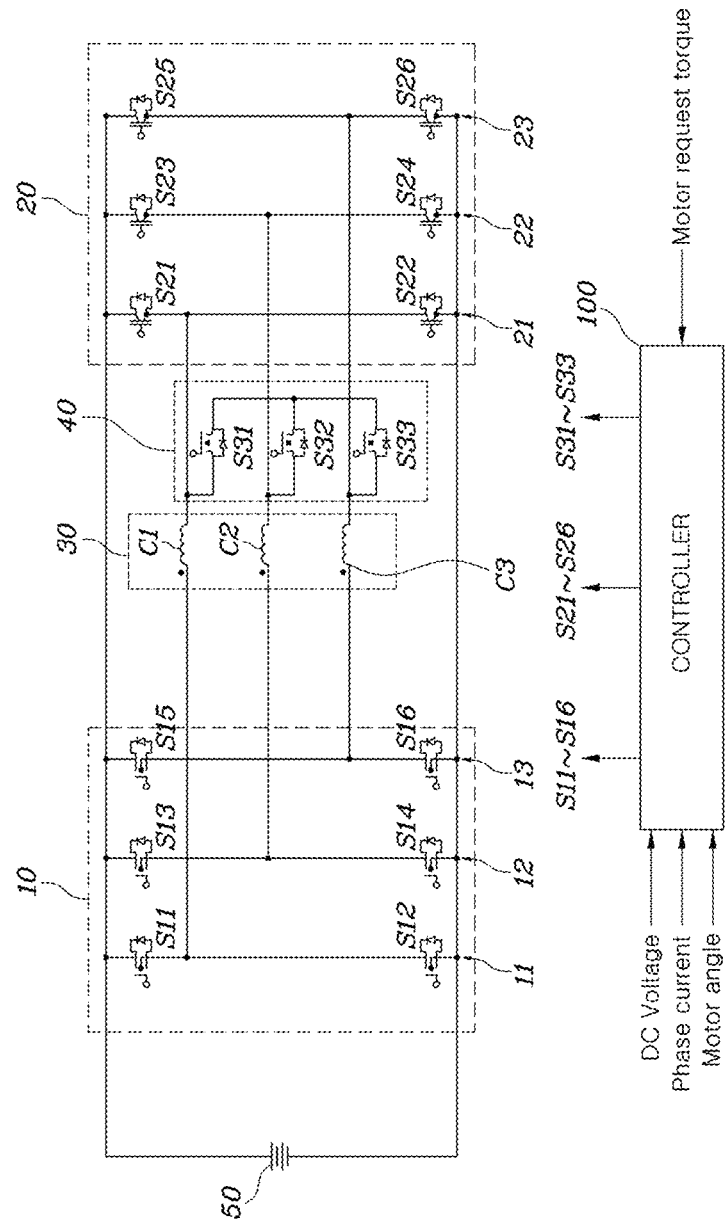
FIG. 1 is a circuit diagram of a motor driving system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereafter, various embodiments of the present disclosure will be described in detail with reference to the accompanying drawings and the same or similar components are provided the same reference numerals regardless of the numbers of figures and are not repeatedly described. Terms "module" and "unit" that are used for components in the following description are used only for the convenience of description without having discriminate meanings or functions. In the following description, if it is decided that the detailed description of known technologies related to the present disclosure makes the subject matter of the exemplary embodiments described herein unclear, the detailed description is omitted. Furthermore, the accompanying drawings are provided only for easy understanding of embodiments included in the specification, the technical spirit included in the specification is not limited by the accompanying drawings, and all changes, equivalents, and replacements may be understood as being included in the spirit and scope of the present disclosure.

Terms including ordinal numbers such as "first", "second", etc., may be used to describe various components, but the components are not to be construed as being limited to the terms. The terms are used only to distinguish one component from another component.

It is to be understood that when one element is referred to as being "connected to" or "coupled to" another element, it may be directly connected to or directly coupled to another element or be connected to or coupled to another element, including the other element intervening therebetween. On the other hand, it may to be understood that when one element is referred to as being "directly connected to" or "directly coupled to" another element, it may be connected to or coupled to another element without the other element intervening therebetween.

Singular forms are intended to include plural forms unless the context clearly indicates otherwise.

It will be further understood that the terms "comprises" or "have" used in the present specification, specify the presence of stated features, steps, operations, components, parts, or a combination thereof, but do not preclude the presence or addition of one or more other features, numerals, steps, operations, components, parts, or a combination thereof.

A unit or a control unit which is included in names such as a motor control unit (MCU) and a hybrid control unit (HCU) is only a term which is generally used to name a controller that is configured to control specific functions of a vehicle rather than mean a generic function unit. For example, each control unit may include a communication device that communicates with another control unit or a sensor to control corresponding functions, a memory that stores an operating system or logic commands and input/output information, and one or more processors that performs determination, calculation, decision, etc. For controlling the corresponding functions.

FIG. 1 is a circuit diagram of a motor driving system according to an exemplary embodiment of the present disclosure.

As shown in FIG. 1, a motor driving system may include a first inverter 10, a second inverter 20, a motor 30 including a plurality of windings C1~C3 corresponding to a plurality of phases, respectively, a mode switch unit 40, a battery 50, and a controller 100.

The first inverter 10 may include a plurality of first switching devices S11~S16 connected to first ends of the plurality of windings C1~C3, respectively, and the second inverter 20 may include a plurality of second switching devices S21~S26 connected to second ends of the plurality of windings C1~C3, respectively. The mode switch unit 40 may include a plurality of mode change switches S31~S33 connected between the second ends of the plurality of windings C1~C3 and neutral ends for the plurality of windings C1~C3. The controller 100 can control ON/OFF-states of the first switching devices S11 to S16, the second switching devices S21 to S26, and the mode change switches S31 to S33 based on motor request output (i.e., a torque command to the motor), the DC terminal voltages of the inverters 10 and 20 (i.e., the voltage of the battery), the phase current of the motor, and a motor angle.

The first inverter 10 and the second inverter 20 can convert the DC power stored in the battery 50 into AC power and output the AC power to the motor 30 or can convert regenerative braking energy, which is generated by regenerative braking torque which is generated by the motor 30 in regenerative braking, into DC and output the DC to a battery 50. Such conversion between DC power and AC power may be achieved by pulse width modulation control of the plurality of first switching devices S11~S16 and the plurality of second switching devices S21~S26 included in the first inverter 10 and the second inverter 20, respectively.

The first converter 10 may include a plurality of legs 11~13 to which DC voltage generated at a DC link capacitor connected between both ends of the battery 50 is applied. The legs 11~13 may be electrically connected to correspond to a plurality of phases of the motor 30, respectively.

The second converter 20 may include a plurality of legs 21~23 to which DC voltage generated at a DC link capacitor connected between both ends of the battery 50 is applied. The legs 21~23 may be electrically connected to correspond to a plurality of phases of the motor 30, respectively.

The controller 100 can control ON/OFF-states of third switching devices S31 S33 included in the mode switch unit 40 and can determine whether to drive the motor 30 through the second inverter 20, depending on motor driving modes.

The motor driving modes may include a first driving mode and a second driving mode. The first driving mode may be referred to as a "Closed End Winding (CEW) mode" and the second driving mode may be referred to as an "Open End Winding (OEW) mode".

In more detail, the controller 100 can control the mode change switches S31~S33 into the on-state and can drive the motor 30 through the first inverter 10 of the two inverters 10 and 20 when the CEW mode is performed. The mode change switches S31 S33, in the on-state, can electrically connect the second ends of the plurality of windings C1~C3 and the neutral ends for the plurality of windings C1~C3, respectively.

On the other hand, when the OEW mode is performed, the controller 100 can control the mode change switches S31~S33 into the off-state and can drive the motor 30 through the two inverters 10 and 20. The mode change switches S31~S33, in the off-state, can electrically disconnect the second ends of the plurality of windings C1~C3 and the neutral ends for the plurality of windings C1~C3, respectively.

That is, the first inverter 10 can drive the motor 30 in the CEW mode and the OEW mode, but the second inverter 20 can drive the motor 30 in the OEW mode of the CEW mode and the OEW mode.

Figure 2:
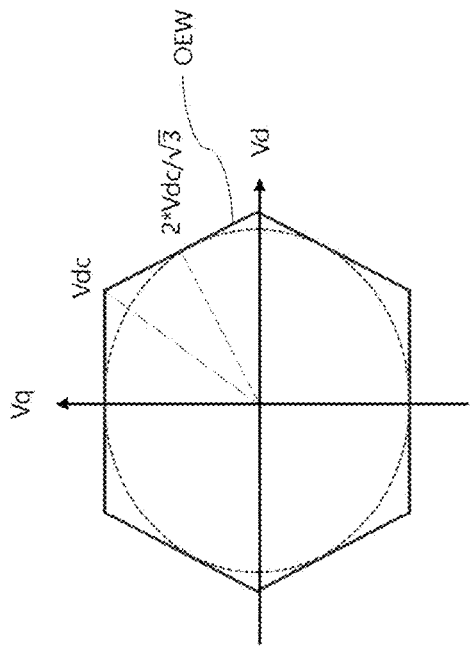
FIG. 2 and FIG. 3 are views exemplarily illustrating output of a motor in each of motor driving modes according to an exemplary embodiment of the present disclosure.
Figure 2:
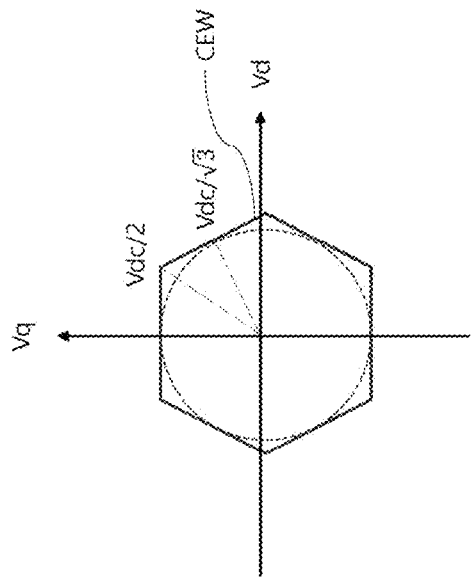
Figure 3:
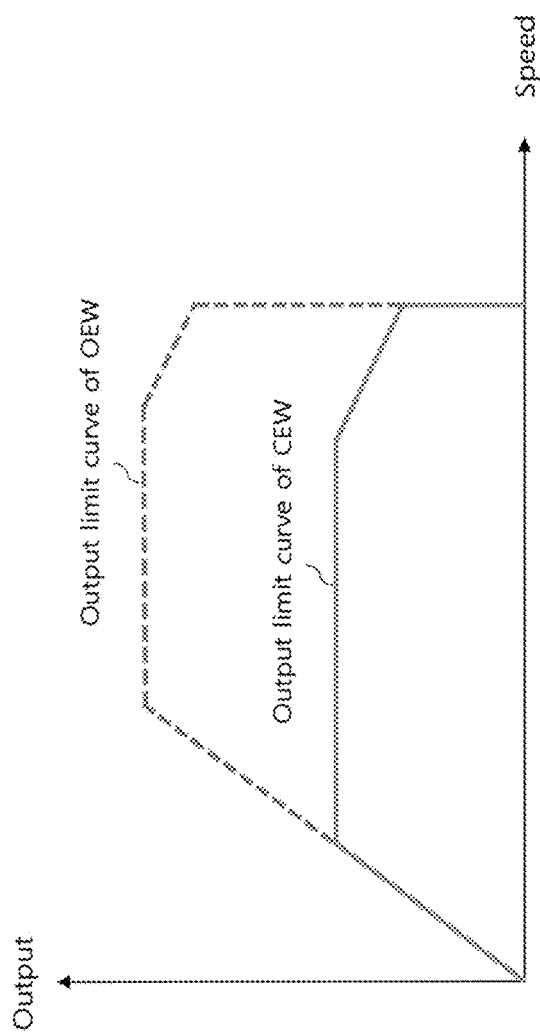

FIG. 2 and FIG. 3 are views exemplarily illustrating output of a motor in each of motor driving modes according to an exemplary embodiment of the present disclosure.

Referring to FIG. 2, the range in which phase voltages of the motor 30 may be combined is hexagon in each of the CEW mode and the OEW mode. For example, the phase voltages of the motor 30 may be combined maximally by "Vdc/2" in the CEW mode and by "Vdc" in the OEW mode. The "Vde" is the voltage of the battery 50. The inscribed circles of the hexagons may be ranges in which the phase voltages may be linearly combined through Space Vector Pulse Width Modulation (SVPWM) control.

For example, the phase voltages of the motor 30 may be combined maximally by "Vdc/$\sqrt{3}$" in the CEW mode and by "2*Vdc/$\sqrt{3}$" in the OEW mode through SVPWM control. That is, the range in which phase voltages may be combined is wider in the OEW mode than the CEW mode, and the maximum output of the motor 30 can also be larger in the OEW mode than the CEW mode.

Referring to FIG. 3, output limit curves of the motor 30 according to the speed of the motor 30 are shown for the CEW mode and the OEW mode, respectively. Because the maximum output of the motor is larger in the OEW mode than the CEW mode, the OEW mode can have an output limit over the output limit of the CEW mode. The output limit curves of the OEW mode and the CEW mode may be set in consideration of the durability, heat generation ability, current control ability, etc. of the motor 30 and the inverters 10 and 20.

Meanwhile, the output of the motor 30 may be disconnected due to the output limit of the CEW mode when the driving modes are switched, which will be described in detail with reference to FIG. 4.

Figure 4:
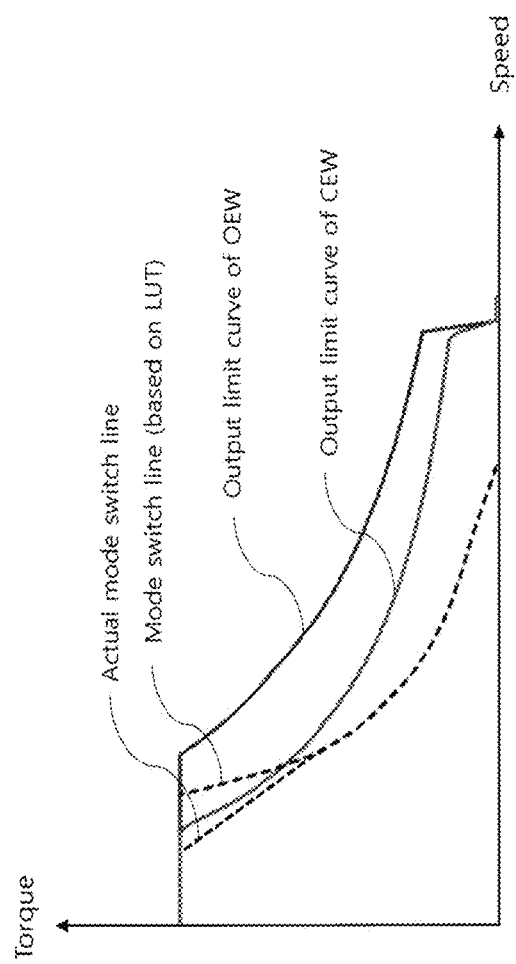
FIG. 4 is a view exemplarily illustrating a process in which motor driving modes according to an exemplary embodiment of the present disclosure are switched.

FIG. 4 is a view exemplarily illustrating a process in which motor driving modes according to an exemplary embodiment of the present disclosure are switched.

Referring to FIG. 4, an operation point map showing the output limit curve of the CEW mode, the output limit curve of the OEW mode, a mode switch line based on a lookup table (LUT), and an actual mode switch line is shown.

The lookup table (LUT) is derived through a test which is configured to measure efficiency at all operating points of the motor 30 at each DC terminal voltage of the inverters 10 and 20, and may include information related to a mode including higher efficiency of the CEW mode and the OEW mode in each combination of torque and counter magnetic flux. The counter magnetic flux may be inversely proportioned to the DC terminal voltages of the inverters 10 and 20 and may be proportioned to the speed of the motor 30. The mode switch line is set by the lookup table (LUT) and may be the boundary line between a high efficiency region of the CEW mode and a high efficiency region of the OEW mode. Depending on embodiments, the mode switch line may be variously set in accordance with the specifications of the motor driving system, etc.

When the motor driving modes are switched based on the mode switch line, the efficiency of the motor 30 and the inverters 10 and 20 may be maximized. However, as shown in FIG. 4, when the operating point corresponding to the mode switch line comes out of the output limit of the CEW mode and the motor driving modes are switched based on the mode switch line, the output of the motor 30 may be disconnected. For example, when a motor driving mode is changed into the OEW mode from the CEW mode in a high torque region, the output of the motor 30 is reduced by the output limit of the CEW mode before the OEW mode is entered, so that the output of the motor 30 may be instantaneously disconnected when the OEW mode is entered.

Accordingly, when the mode switch line based on the lookup table (LUT) is corrected to the actual mode switch line so that the motor driving modes are switched within the output limit of the CEW mode, it is possible to prevent output disconnection of the motor which is generated when the motor driving modes are switched.

However, because the efficiency of the CEW mode is higher than the efficiency of the OEW mode in the operating point region between the actual mode switch line and the mode switch line, it is disadvantageous in terms of fuel efficiency of an electrified vehicle to switch the motor driving modes based on the actual mode switch line.

Accordingly, in the exemplary embodiment of the present disclosure, it is provided to improve fuel efficiency of an electrified vehicle by easing the output limit of the CEW mode to prevent output disconnection of the motor and switch the motor driving modes at or close to an operating point according to the mode switch line when a predetermined condition is satisfied by correcting the mode switch line to the actual mode switch line. A structure for the present purpose is shown in FIG. 5.

Figure 5:
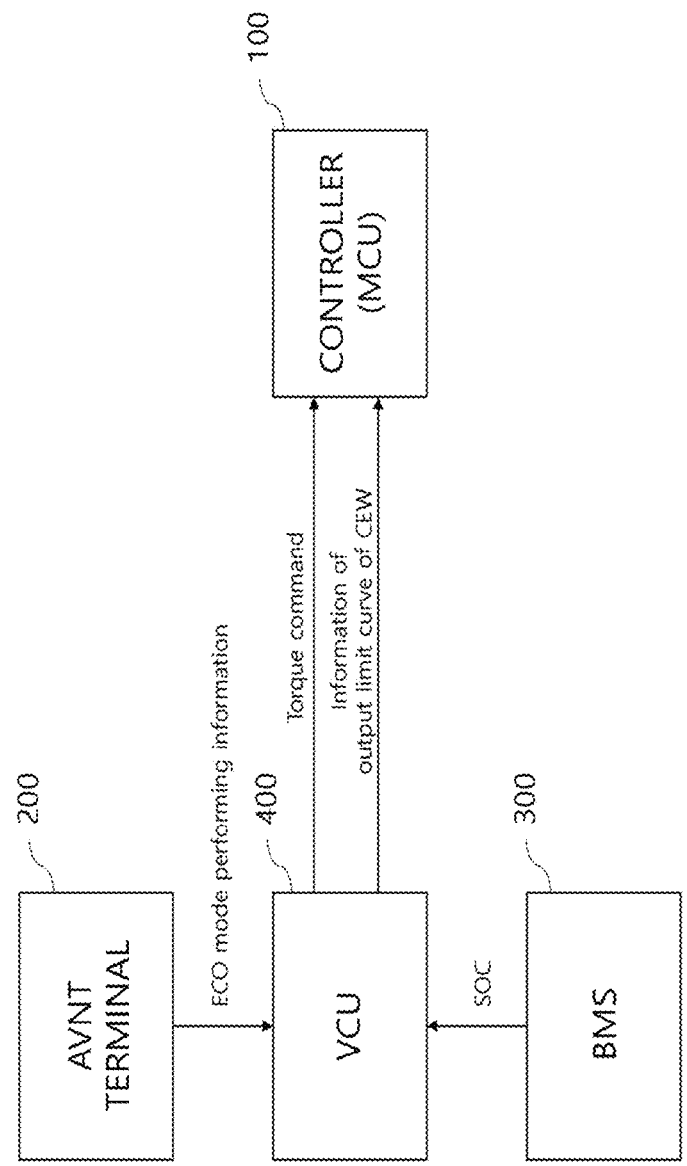
FIG. 5 is a block diagram showing an example of the configuration of a control system of an electrified vehicle according to an exemplary embodiment of the present disclosure.

FIG. 5 is a block diagram showing an example of the configuration of a control system of an electrified vehicle according to an exemplary embodiment of the present disclosure.

As shown in FIG. 5, the control system of an electrified vehicle may include a controller 100, an Audio/Video/Navigation/Telematics (AVNT) terminal 200, a battery controller 300, and a vehicle controller 400.

The controller 100 may be a Motor Control Unit (MCU) that performs pulse width modulation control based on a torque command for the motor 30 received from the vehicle controller 400, etc. When a predetermined command for entering an Economical mode (ECO mode) is input from a driver, the AVNT terminal 200 can transmit ECO mode performing information to the vehicle controller 400. The ECO mode may be a mode for improving efficiency of the electrified vehicle. The battery controller 300 may be a Battery Management System (BMS) that manages the State of charge (SOC) value of the battery 50 and transmits the SOC value of the battery 50 to the vehicle controller 400. The vehicle controller 400 may be a Vehicle Control Unit (VCU) which is an upper controller of the controller 100, the AVNT terminal 200, and the battery controller 300.

The vehicle controller 400 can determine one of first and second output limit curves as the output limit curve of the CEW mode, depending on whether a preset condition for easing the output limit of the CEW mode, and can transmit information related to the determined output limit curve to the controller 100. For example, the vehicle controller 400 may be configured to transmit an identifier of the determined output limit curve when the first and second output limit curves are stored in advance in the controller 100. However, this is an example and the present disclosure is not necessarily limited thereto.

In more detail, the vehicle controller 400 can determine the first output limit curve as the output limit curve of the CEW mode when a preset condition is not satisfied, and can determine the second output limit curve as the output limit curve of the CEW mode when the preset condition is satisfied. The first output limit curve is set in consideration of the durability, heat generation ability, current control ability, etc. of the inverters 10 and 20, and the second output limit curve may have an output limit over the output limit of the first output limit curve at least in a partial operating point region to ease the output limit of the motor 30 when the preset condition is satisfied.

The preset condition may include a condition for entering the ECO mode in accordance with a predetermined command, a condition in which the ECO mode is inactivated for a predetermined rest time before the ECO mode is entered, and a condition in which the battery 50 connected to the DC terminals of the inverters 10 and 20 has SOC over a preset value.

The controller 100 can set the output limit for the CEW mode as the first output limit curve or the second output limit curve corresponding to the information related to the output limit curve of the CEW mode.

The controller 100 can bidirectionally switch the CEW mode and the OEW mode within an operating point range according to the output limit curve of the CEW mode based on a torque command for the motor 30 and counter magnetic flux of the motor 30 according to the torque command. In more detail, the controller 100 can correct the mode switch line based on the lookup table to the actual mode switch line so that the CEW mode and the OEW mode are switched within an operating point range according to the output limit curve of the CEW mode. Thereafter, the controller 100 can bidirectionally switch the CEW mode and the OEW mode in accordance with the value of the torque command and the counter magnetic flux of the motor based on the actual mode switch line.

The controller 100 can generate a current command for the motor 30 under the output limit according to the output limit curve of the CEW mode when the CEW mode is performed, and can generate a current command for the motor 30 under the output limit according to the output limit curve of the OEW mode when the OEW mode is performed. The output limit curve of the OEW mode may be stored in the controller 100.

Figure 6:
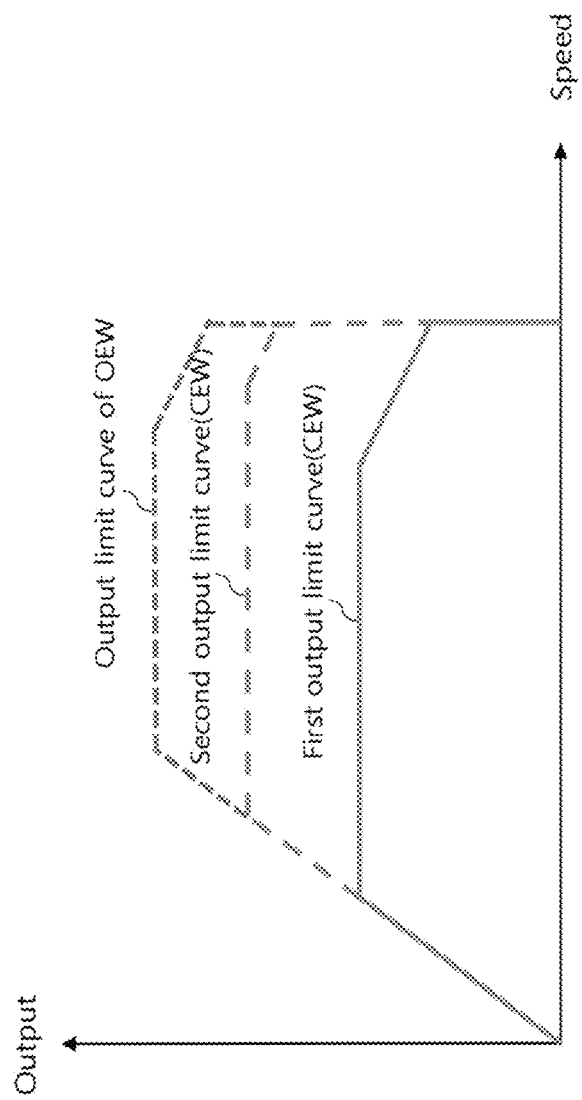
FIG. 6 is a view exemplarily illustrating first and second output limit curves for a CEW mode according to an exemplary embodiment of the present disclosure.

FIG. 6 is a view exemplarily illustrating first and second output limit curves for the CEW mode according to an exemplary embodiment of the present disclosure.

Referring to FIG. 6, first and second output limit curves for the CEW mode may have an output limit under the output limit according to the output limit curve of the OEW mode. The second output limit curve may have an output limit over the output limit of the first output limit curve.

Figure 7:
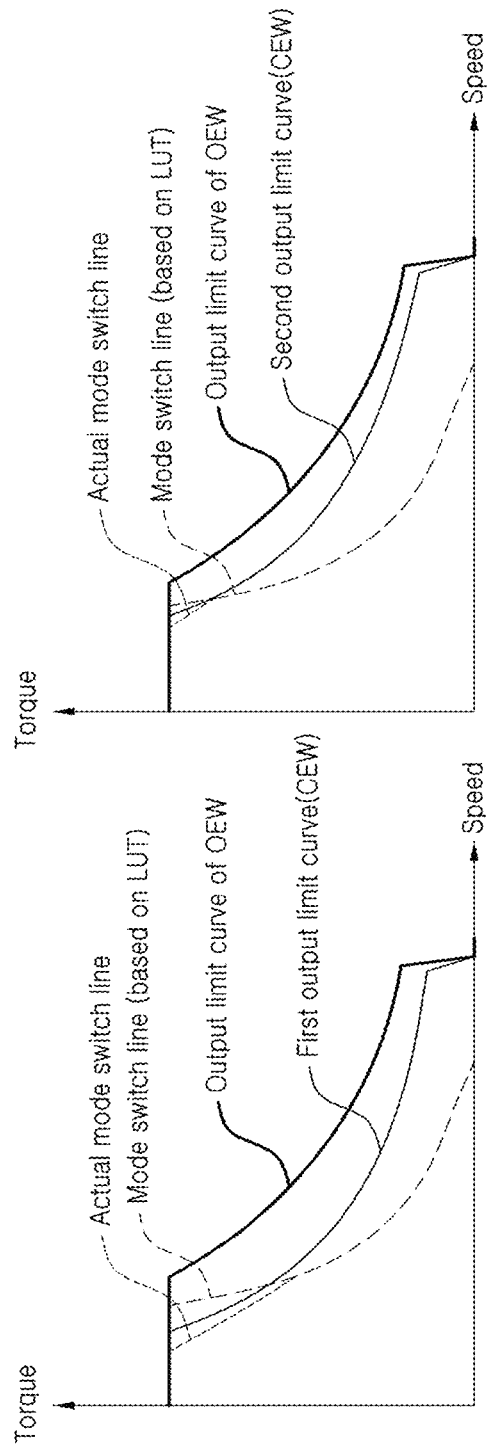
FIG. 7 is a view exemplarily illustrating a process in which motor driving modes are switched by the first and second output limit curves for a CEW mode according to an exemplary embodiment of the present disclosure.

FIG. 7 is a view exemplarily illustrating a process in which motor driving modes are switched by the first and second output limit curves for the CEW mode according to an exemplary embodiment of the present disclosure.

In FIG. 7, the left one corresponds to the case in which the output limit curve of the CEW mode is set as a first output limit curve and the right one corresponds to the case in which the output limit curve of the CEW mode is set as a second output limit curve. The actual mode switch line may be closer to the mode switch line in the right one than the left one in FIG. 7.

Accordingly, when the preset condition is satisfied, the controller 100 switches the motor driving mode based on the actual mode switch line corrected by the second output limit line, being able to improve fuel efficiency of the electrified vehicle.

Figure 8:
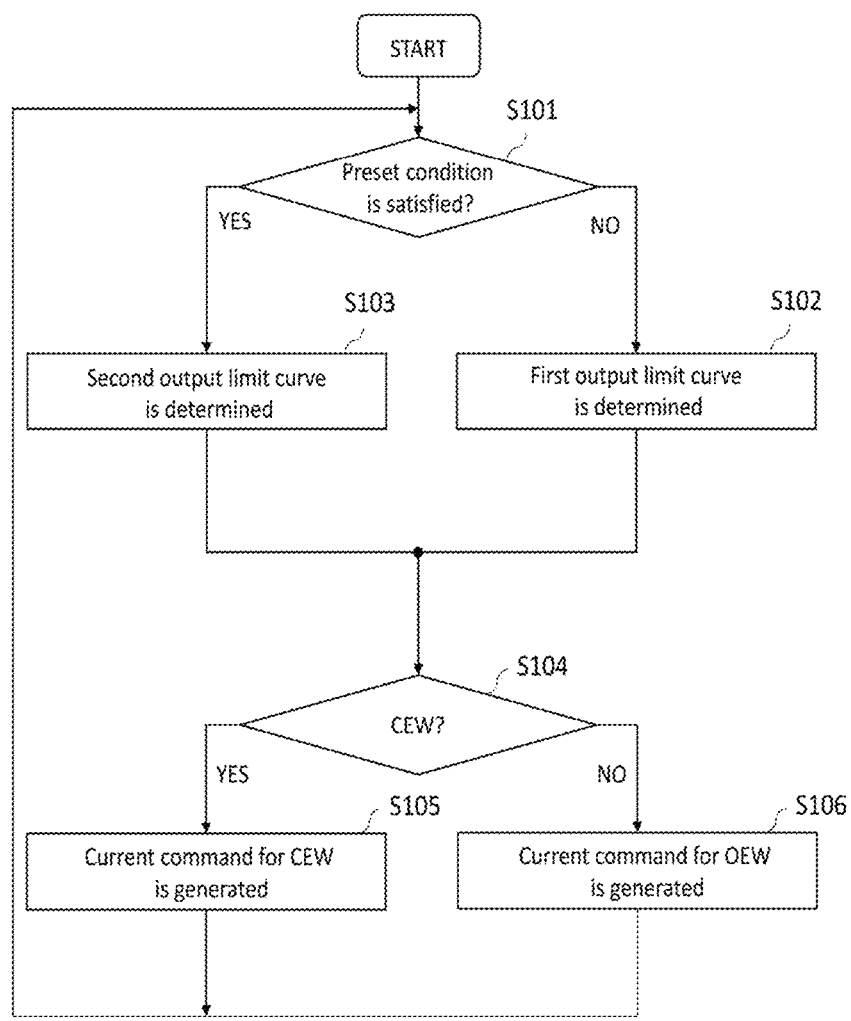
FIG. 8 is a flowchart illustrating a method of controlling an electrified vehicle according to an exemplary embodiment of the present disclosure.

FIG. 8 is a flowchart illustrating a method of controlling an electrified vehicle according to an exemplary embodiment of the present disclosure.

Referring to FIG. 8, the vehicle controller 400 can determine whether a preset condition for easing the output line of the CEW mode is satisfied (S101). As described above, the preset condition may include a condition for entering the ECO mode in accordance with a predetermined command, a condition in which the ECO mode is inactivated for a predetermined rest time before the ECO mode is entered, and a condition in which the battery 50 connected to the DC terminals of the inverters 10 and 20 has SOC over a preset value. In more detail, when the ECO mode is entered in accordance with a predetermined command, the ECO mode is inactivated for a predetermined rest time before the ECO mode is entered, and SOC value of the battery 50 is over a preset value, the vehicle controller 400 can determined that the predetermined condition is satisfied.

Thereafter, the vehicle controller 400 can determine any one of the first and second output limit lines as the output limit line of the CEW, depending on whether the preset condition is satisfied. In more detail, the vehicle controller 400 can determine the first output limit line as the output limit line of the CEW mode when the preset condition is not satisfied (NO in S101) (S102). On the other hand, when the preset condition is satisfied (YES in S101), the vehicle controller 400 can determine the second output limit line as the output limit line of the CEW mode (S103).

The controller 100 can determine whether to switch the CEW mode and the OEW mode within an operating point range according to the output limit curve of the CWE mode based on the value of a torque command for the motor 30 and counter magnetic flux of the motor 30. Accordingly, whether to perform the CEW mode may be determined (S104).

When the CEW mode is performed (YES in S104), the controller 100 can generate a current command under the output limit according to the output limit line of the CEW mode and can drive the motor 30 through the first inverter 10 of the first inverter 10 and the second inverter 20 based on the generated current command (S105).

When the COEW mode is performed (NO in S104), the controller 100 can generate a current command under the output limit according to the output limit line of the OEW mode and can drive the motor 30 through the first inverter 10 and the second inverter 20 based on the generated current command (S106).

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electrified vehicle comprising:
   a motor including a plurality of windings;
   a first inverter connected to a first end of each of the windings and configured to drive the motor;
   a second inverter connected to a second end of each of the windings and configured to drive the motor in a second driving mode of a first driving mode and the second driving mode;
   a first controller configured to determine one of first and second output limit lines as an output limit line of the first driving mode, depending on whether a preset condition is satisfied; and
   a second controller configured to bidirectionally switch the first driving mode and the second driving mode within an operating point range according to the output limit line of the first driving mode in accordance with a value of a torque command for the motor and counter magnetic flux of the motor.

2. The electrified vehicle of claim 1, further including a plurality of mode change switches configured to electrically connect the second ends of the plurality of windings and neutral ends for the plurality of windings, respectively, in the first driving mode, and configured to electrically disconnect the second ends of the plurality of windings and the neutral ends, respectively, in the second driving mode.

3. The electrified vehicle of claim 1,
   wherein the first controller is configured to determine the first output limit line as the output limit line of the first driving mode when the preset condition is not satisfied, and to determine the second output limit line as the output limit line of the first driving mode when the preset condition is satisfied, and wherein the second output limit line has an output limit over an output limit of the first output line at least in a partial operating point region.

4. The electrified vehicle of claim 3, wherein the preset condition includes a condition for entering an ECO mode in accordance with a predetermined command.

5. The electrified vehicle of claim 4, wherein the preset condition includes a condition in which the ECO mode is inactivated for a predetermined rest time before the ECO mode is entered.

6. The electrified vehicle of claim 3, wherein the preset condition includes a condition in which a battery connected to DC terminals of the first inverter and the second inverter has a state of charge (SOC) over a preset value.

7. The electrified vehicle of claim 1, wherein the second controller is configured to correct a mode switch line based on a lookup table so that the first driving mode and the second driving mode are switched within the operating point range according to the output limit line of the first driving mode, and to switch the first driving mode and the second driving mode based on the corrected mode switch line in accordance with the value of the torque command and the counter magnetic flux of the motor.

8. The electrified vehicle of claim 1, wherein the second controller is configured to generate a current command for the motor under an output limit according to the output limit line of the first driving mode when the first driving mode is performed.

9. A method of controlling an electrified vehicle, the method comprising:
  determining one of first and second output limit lines as an output limit line of a first driving mode, depending on whether a preset condition is satisfied;
  determining whether to switch the first driving mode and a second driving mode within an operating point range according to the output limit line of the first driving mode in accordance with a value of a torque command for a motor and counter magnetic flux of the motor;
  driving the motor through a first inverter of the first inverter and a second inverter when the first driving mode is performed; and
  driving the motor through the first inverter and the second inverter when the second driving mode is performed.

10. The method of claim 9,
  wherein the first inverter is connected to a first end of each of the windings included in the motor;
  wherein the second inverter is connected to a second end of each of the windings;
  wherein the first driving mode is a mode in which the second ends of the plurality of windings and neutral ends for the plurality of windings are electrically connected, respectively, by a plurality of mode change switches; and
  wherein the second driving mode is a mode in which the second ends of the plurality of windings and the neutral ends are electrically disconnected by the plurality of mode change switches.

11. The method of claim 9,
  wherein the determining one of first and second output limit lines as an output limit line of a first driving mode includes:
    determining the first output limit line as the output limit line of the first driving mode when the preset condition is not satisfied; and
    determining the second output limit line as the output limit line of the first driving mode when the preset condition is satisfied, and
  wherein the second output limit line has an output limit over an output limit of the first output line at least in a partial operating point region.

12. The method of claim 11, wherein the preset condition includes a condition for entering an ECO mode in accordance with a predetermined command.

13. The method of claim 12, wherein the preset condition includes a condition in which the ECO mode is inactivated for a predetermined rest time before the ECO mode is entered.

14. The method of claim 11, wherein the preset condition includes a condition in which a battery connected to DC terminals of the first inverter and the second inverter has SOC over a preset value.

15. The method of claim 9, wherein the determining of whether to switch includes:
  correcting a mode switch line based on a lookup table so that the first driving mode and the second driving mode are switched within the operating point range according to the output limit line of the first driving mode; and
  switching the first driving mode and the second driving mode based on the corrected mode switch line in accordance with the value of the torque command and the counter magnetic flux of the motor.

16. The method of claim 9, further including: generating a current command for the motor under an output limit according to the output limit line of the first driving mode when the first driving mode is performed.

* * * * *